US012086056B2

(12) United States Patent
Kadirvel et al.

(10) Patent No.: US 12,086,056 B2
(45) Date of Patent: Sep. 10, 2024

(54) SYSTEM AND METHOD FOR USER INTERFACE TESTING

(71) Applicant: Verizon Patent and Licensing Inc., Basking Ridge, NJ (US)

(72) Inventors: Karthikeyan Kadirvel, Tamil Nadu (IN); Antony S Suresh, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 56 days.

(21) Appl. No.: 17/842,852

(22) Filed: Jun. 17, 2022

(65) Prior Publication Data
US 2023/0409469 A1    Dec. 21, 2023

(51) Int. Cl.
*G06F 11/36*        (2006.01)
*G06F 9/451*        (2018.01)

(52) U.S. Cl.
CPC .......... *G06F 11/3688* (2013.01); *G06F 9/451* (2018.02); *G06F 11/3692* (2013.01)

(58) Field of Classification Search
CPC .............................. G06F 11/38; G06F 11/3692
See application file for complete search history.

(56) References Cited

U.S. PATENT DOCUMENTS

| | | | | |
|---|---|---|---|---|
| 2013/0004087 A1* | 1/2013 | Kumar | ................. | G06V 10/751 |
| | | | | 382/218 |
| 2013/0330004 A1* | 12/2013 | Bala | ........................ | G06T 7/181 |
| | | | | 382/176 |
| 2015/0347284 A1* | 12/2015 | Hey | .................... | G06F 11/3688 |
| | | | | 717/125 |
| 2018/0025503 A1* | 1/2018 | Tsai | ........................ | G06T 11/60 |
| | | | | 382/100 |

\* cited by examiner

*Primary Examiner* — Duy Khuong T Nguyen

(57) ABSTRACT

In an example, a plurality of images of an interface of an application may be identified. An image of the plurality of images may be compared with a second image of the plurality of images to determine a first set of regions, of the interface, in which the second image is different than the first image. Based upon the first set of regions, a set of dynamic regions of the interface may be determined. A fourth image of the interface may be identified. Based upon the set of dynamic regions, a first portion of the fourth image may be compared with a first portion of the first image to determine user interface testing information associated with the interface of the application.

20 Claims, 14 Drawing Sheets

101 ⟶

124

User Sign-Up Page

Username: [          ]
First Name: [          ]
Last Name: [          ]
Email Address: [          ]

Receive promotional emails from us! ☐

By signing up, you are agreeing to our terms and conditions. For more information, please click here.

[ Sign Up ] [ Close ]

User Sign-Up Page

Username: [ TitaniumBikes ]
First Name: [ John ]
Last Name: [ Smith ]
Email Address: [ johnsmith1776@emailservice.com ]

Receive promotional emails from us! ✓

By signing up, you are agreeing to our terms and conditions. For more information, please click here.

[ Sign Up ] [ Close ]

User Sign-Up Page

138

Username:

First Name:

Last Name:

Email Address:

Receive promotional emails from us!

By signing up, you are agreeing to our terms and conditions. For more information, please click here.

[ Sign Up ]  [ Close ]

User Sign-Up Page

| Username: | Timtasticbikes |
| First Name: | Tim |
| Last Name: | Jones |
| Email Address: | timjones2020@emailservice.com |

Receive promotional emails from us! ☐

By signing up, you are agreeing to our terms and conditions. For more information, please click here.

[ Sign Up ]

FIG. 1J

SYSTEM AND METHOD FOR USER INTERFACE TESTING

BACKGROUND

Users are provided with services via applications, such as mobile applications, web applications (e.g., websites), client applications, gaming applications, etc. A user may interact with a user interface of an application. In an example where the application is a shopping application, the user may add items to their shopping cart, read reviews of the items, order the items, etc. using the user interface. However, if the user interface has errors, such as where buttons, graphical objects, text, etc. aren't shown or are misplaced, the application may not function correctly and/or the user may not be able to use the application, thereby contributing to a negative experience for the user.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 1C is a diagram illustrating an example of a reference image according to some embodiments.

FIG. 1D is a diagram illustrating an example of a second image according to some embodiments.

FIG. 1I is a diagram illustrating an example of a set of dynamic region contours according to some embodiments.

FIG. 1J is a diagram illustrating an example of a fourth image according to some embodiments.

DETAILED DESCRIPTION OF EXAMPLE EMBODIMENTS

Figure 1A:
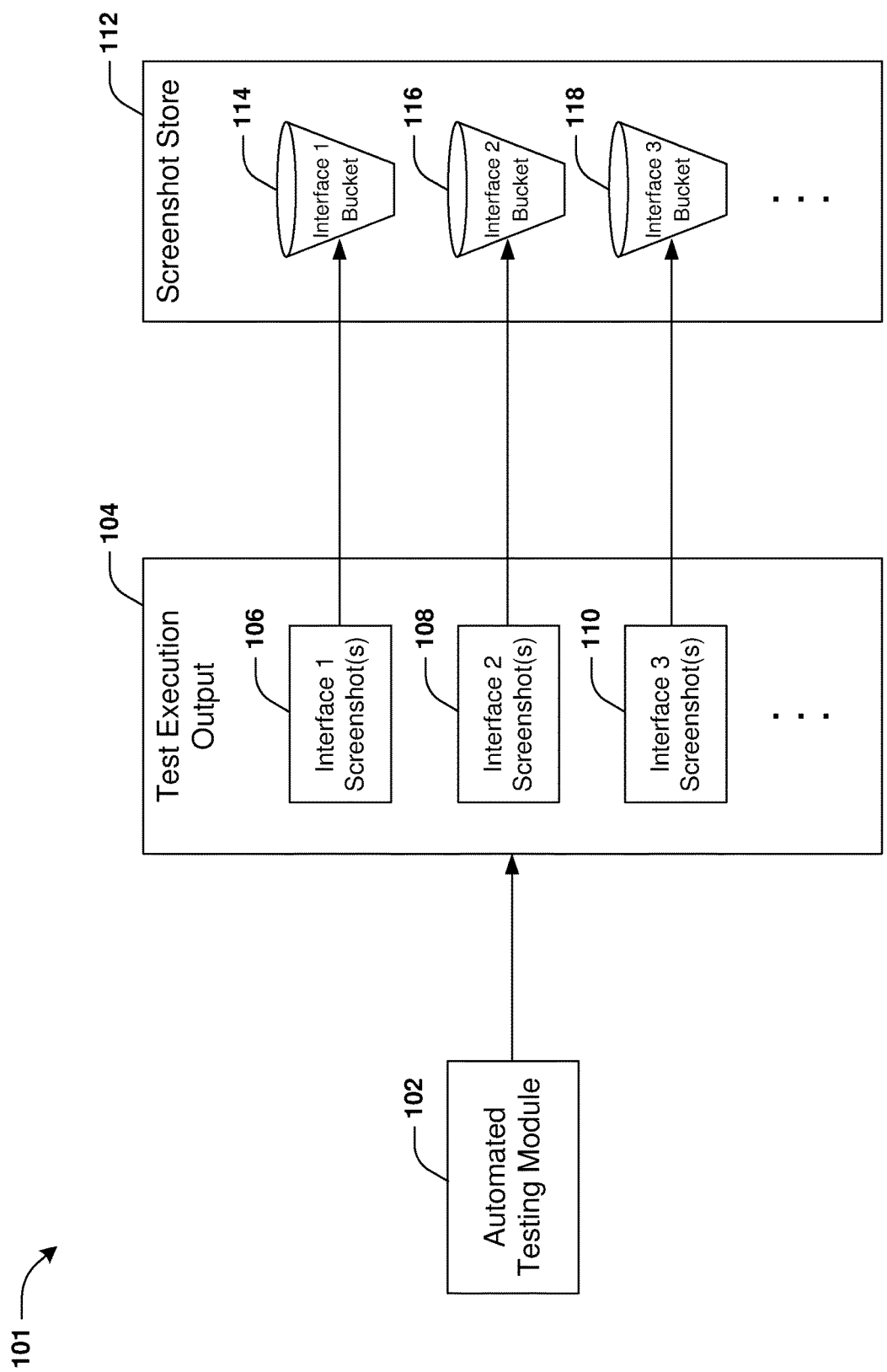
FIG. 1A is a diagram illustrating an example system for performing user interface testing, where images of one or more interfaces are generated and/or stored according to some embodiments.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of scenarios in which the disclosed subject matter may be utilized and/or implemented.

One or more systems and/or techniques for performing user interface testing are provided. A user may interact with a user interface of an application. However, if the user interface has errors, such as where buttons, graphical objects, text, etc. aren't shown or are misplaced, the application may not function correctly and/or the user may not be able to use the application, thereby contributing to a negative experience for the user. In some cases, a tester may be tasked with manually testing the user interface of the application to test for user interface errors and/or validate the user interface. However, manually testing the user interface may be expensive, and due to human error, the tester may miss at least some user interface errors that exist in the application.

Thus, in accordance with one or more of the techniques provided herein, user interface testing may be performed to automatically detect user interface errors in the application. The user interface testing may be performed using images of one or more interfaces of the application, such as screenshots of the application captured when automated tests of the application are being executed. Using one or more of the techniques provided herein, the images of interfaces of the application are used to determine (e.g., learn) dynamic regions and/or static regions of interfaces of the application. The images, the dynamic regions and/or the static regions may be used for user interface testing (e.g., user interface validation) of the application, such as testing that is performed to determine whether or not an interface of the application functions correctly and/or whether or not features of the interface are displayed properly (e.g., as intended by an entity designing and/or maintaining the application). A dynamic region may correspond to a region of an interface of the application that has visual characteristics that change due to factors such as at least one of time, user interactions, data input to the application, etc. A static region may correspond to a region of an interface of the application that is not configured to change (e.g., is not configured to change visually). Since static regions of the application are not configured to change (and/or are configured to change less frequently than dynamic regions), identification of a change in a static region of the application may be reflective of a user interface error in the application. Using the techniques herein, user interface errors associated with changes to static regions of the application may be detected.

In some examples, one or more corrective actions may be performed based upon the detection of the one or more user interface errors. For example, the one or more corrective actions may comprise flagging the one or more user interface errors and/or sending an alert to a user interface agent device (e.g., a device belonging to an agent tasked with maintaining and/or testing the application, such as a testing developer of the application). The alert may be indicative of the one or more user interface errors and/or may be indicative of instructions to fix the one or more user interface errors such that the agent can quickly and/or conveniently fix the one or more user interface errors. In an example, the alert may comprise an email notification sent to an email account associated with the agent. The alert may be transmitted automatically in response to the detection of the one or more user interface errors. Alternatively and/or additionally, the one or more corrective actions may comprise issuing a ticket (indicative of the one or more user interface errors, for example) to an issue tracking system associated with the application (e.g., the issue tracking system may keep track of statuses of tickets). The issue tracking system may notify (e.g., automatically notify) the user interface agent device of the ticket, and may label the ticket as "closed" once the ticket is determined to be resolved (e.g., the one or more user interface errors are fixed). Alternatively and/or additionally, the one or more corrective actions may comprise modifying (e.g., automatically modifying) the application to fix the one or more user interface errors.

Accordingly, using one or more of the techniques provided herein, the one or more user interface errors may be detected automatically with less (and/or zero) manual effort and/or with increased accuracy. Alternatively and/or additionally, performing the one or more corrective actions may result in the one or more user interface errors being fixed more quickly, and thus may result in improved performance of a computer running the application.

FIGS. 1A-1M illustrate examples of a system 101 for performing user interface testing of a first application. In an example, the first application may comprise a mobile application, a web application (e.g., a website), a client application, a gaming application, etc. Examples of the first application include a shopping application (e.g., a shopping website, a shopping mobile application, etc. with which one or more products and/or services can be purchased), an email application, a content application (e.g., a content website, a content mobile application, etc. with which music, videos, blogs, etc. can be consumed and/or shared), a communication application (e.g., a communication website, a communication mobile application, etc. with which users can communicate with each other via messaging, calls, etc.), etc. Interface testing may be performed on the first application periodically to ensure that the first application functions properly over time. In an example, a user (tester) may access and/or interact with the first application using a client device, such as at least one of a desktop, a laptop, a smartphone, a tablet, a wearable device, a computer, hardware, software, etc. Alternatively and/or additionally, interface testing may be performed on the first application after a (new) feature is implemented (e.g., added) to the first application to check whether or not implementation of the feature has an unintended and/or detrimental impact on one or more interfaces of the first application. Alternatively and/or additionally, interface testing may be performed on different versions of the first application, such as one or more application builds of the first application, one or more pre-release versions of the first application, one or more post-release versions of the first application, etc.

According to one or more of the techniques of the present disclosure, images of interfaces of the first application are used to determine (e.g., learn) dynamic regions and/or static regions of interfaces of the first application. The images, the dynamic regions and/or the static regions may be used for user interface testing (e.g., user interface validation) of the first application, such as testing that is performed to determine whether or not an interface of the first application functions correctly and/or whether or not features of the interface are displayed properly (e.g., as intended by an entity designing and/or maintaining the first application). A dynamic region may correspond to a region of an interface of the first application that has visual characteristics that change due to factors such as at least one of time (e.g., in the case of a clock that shows the time, the clock may correspond to a dynamic region since the time indicated by the clock changes throughout the day), user interactions (e.g., a dynamic region may comprise a graphical object that visually changes, such as changes color or shape, due to a selection of a button or other type of user interaction), data input to the application, etc. Examples of a dynamic region include a clock, a text field (into which a user can input text, for example), and/or one or more other dynamic features of the first application. A static region may correspond to a region of an interface of the first application that is not configured to change (e.g., is not configured to change visually). Examples of a static region include a region that comprises text (e.g., unchanging text), an image, etc. Since static regions of the first application are not configured to change (and/or are configured to change less frequently than dynamic regions), identification of a change in a static region of the first application may be reflective of a user interface error in the first application. Using one or more of the techniques herein, one or more user interface errors associated with one or more changes to one or more static regions of the first application may be detected, and/or one or more corrective actions may be performed based upon the detection of the one or more user interface errors.

FIG. 1A illustrates generation and/or storage of images of one or more interfaces of the first application. In some examples, the images may comprise screenshots of the one or more interfaces of the first application. For example, the screenshots may be captured at different times. The screenshots may be captured via one or more automated tests (e.g., automated test cases) of the first application. For example, the one or more automated tests may be executed by an automated testing module 102 (e.g., at least one of an application automation module, a browser automation module, etc.). The one or more automated tests may comprise at least one of one or more regression tests, one or more progression tests, one or more functional tests, etc. In an example, an automated test may comprise execution of operations using one or more features of the first application, such as at least one of opening a home page of the first application, opening a login page of the first application, entering login information (e.g., user credentials used for authentication) into the login page, logging into the first application with the login information, adding items to a shopping cart, checking out the items, etc. Alternatively and/or additionally, during the execution of operations, screenshots of one or more interfaces of the first application may be captured. Embodiments are contemplated in which the screenshots are captured using other techniques (e.g., the screenshots may be captured manually and/or may be captured while one or more users are interacting with the first application) and/or are not captured via the one or more automated tests.

The automated testing module 102 may output test execution information 104 based upon a test executed on the first application. For example, when the test is executed, the automated testing module 102 may generate the test execution information 104 to comprise at least one of results of the test, builds, execution status of the text, (e.g., whether or not the first application passed the test or failed the test), a results table and/or screenshots, of one or more interfaces, that are captured during execution of the test. In an example, the results of the test may be indicative of one or more errors (e.g., functional errors and/or other types of errors) detected in the first application by performing the test. In an example, the test execution information 104 may comprise one or more first screenshots 106 of a first interface "Interface 1" of the first application, one or more second screenshots 108 of a second interface "Interface 2" of the first application, one or more third screenshots 110 of a third interface "Interface 3" of the first application, etc.

In some examples, screenshots output by the automated testing module 102 may be stored in a screenshot data store 112 associated with the first application. The screenshot data store 112 may be organized by interface, such as where the screenshot data store 112 comprises a plurality of datasets (e.g., buckets) corresponding to respective interfaces of the first application. In some examples, an interface may correspond to at least a portion of the first application. For example, an interface may correspond to at least one of a section of the first application, a page of the first application, a web page of the first application, a component of the first application, etc. Screenshots of an interface may be stored in a dataset, of the plurality of datasets, associated with the interface. In an example, the one or more first screenshots 106 of the first interface may be stored in a first dataset 114 (e.g., "Interface 1 Bucket") associated with the first interface, the one or more second screenshots 108 of the second interface may be stored in a second dataset 116 (e.g., "Interface 2 Bucket") associated with the second interface, and/or the one or more third screenshots 110 of the third interface may be stored in a third dataset 118 (e.g., "Interface 3 Bucket") associated with the third interface, etc.

As tests (e.g., automated tests) of the first application are performed and/or new screenshots of interfaces of the first application are captured via the tests, the screenshot data store 112 may be updated by storing the new screenshots into datasets associated with respective interfaces. In some examples, the first dataset 114 may comprise a first plurality of images (e.g., screenshots) of the first interface of the first application. For example, the first plurality of images may comprise screenshots of the first interface captured at different times, captured via different tests and/or captured with different data input to the first application. Accordingly, images of the first plurality of images may differ from each other due to the images being captured during different tests that are performed at different times, with different data, and/or with different executed operations, etc.

Figure 1B:
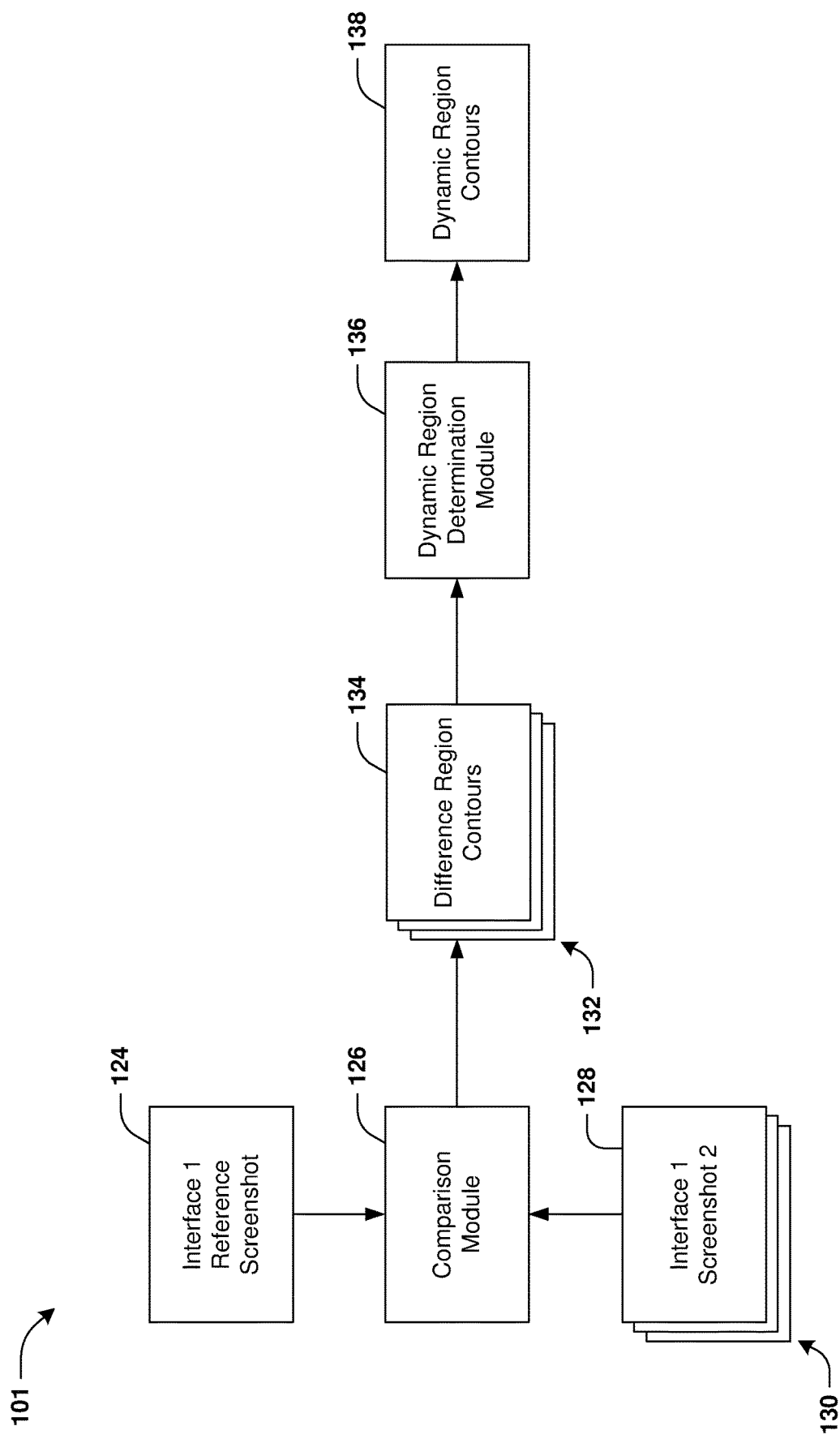
FIG. 1B is a diagram illustrating an example system for performing user interface testing, where a set of dynamic regions of a first interface is determined according to some embodiments.
Figure 1E:
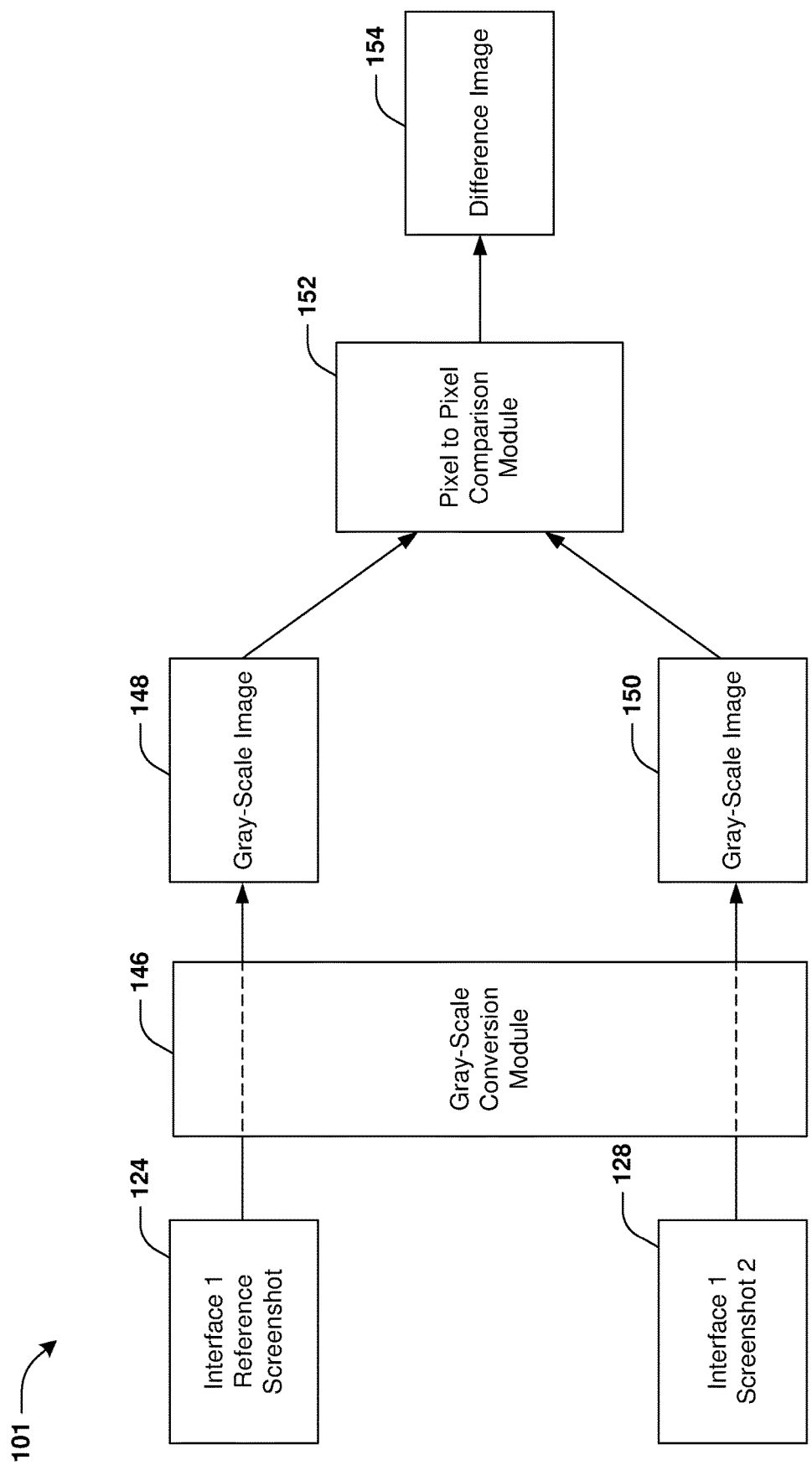
FIG. 1E is a diagram illustrating an example system for performing user interface testing, where a difference image is generated based upon a reference image and a second image according to some embodiments.
Figure 1F:
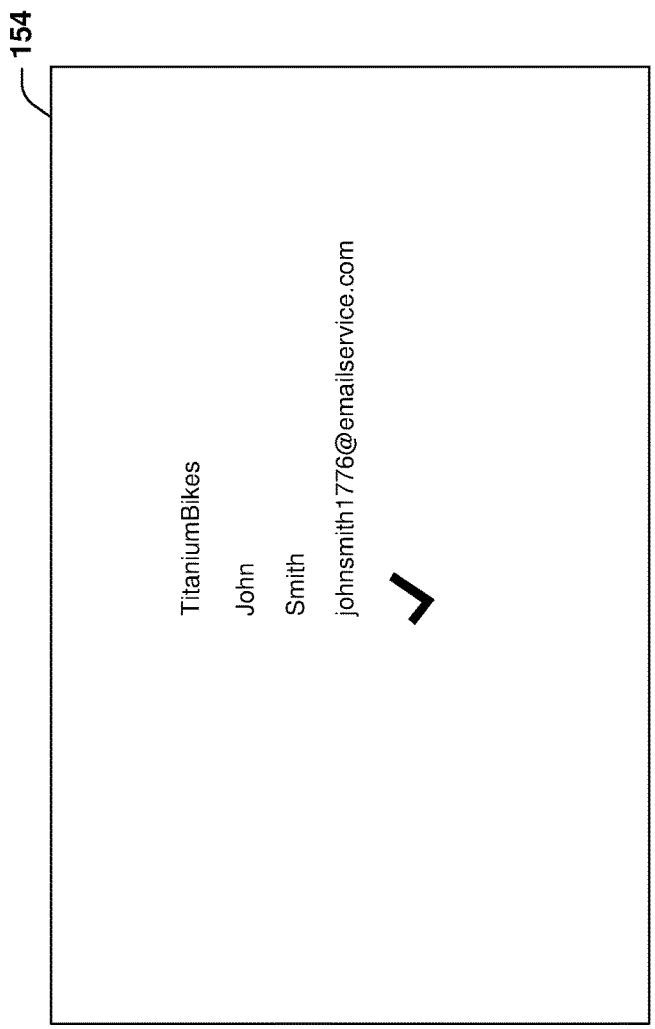
FIG. 1F is a diagram illustrating an example of a difference image representative of differences between a first gray-scale image and a second gray-scale image according to some embodiments.
Figure 1G:
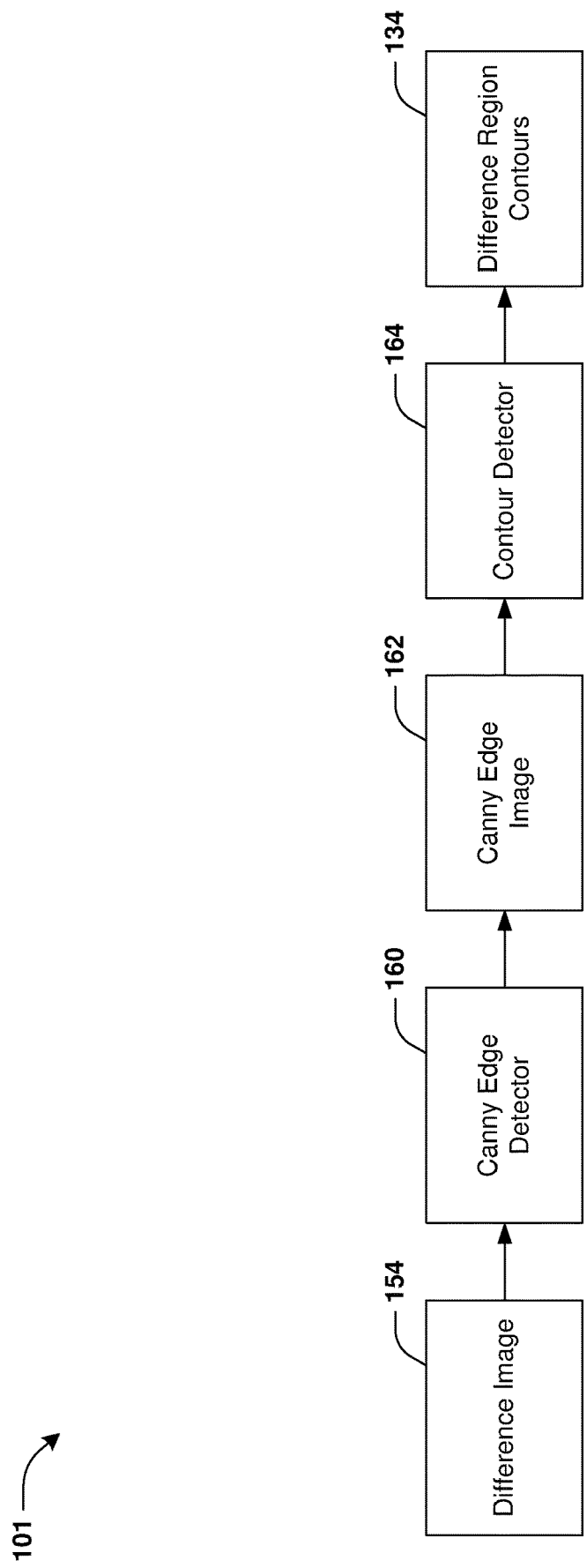
FIG. 1G is a diagram illustrating an example system for performing user interface testing, where a first set of difference region contours is generated based upon a difference image according to some embodiments.
Figure 1H:
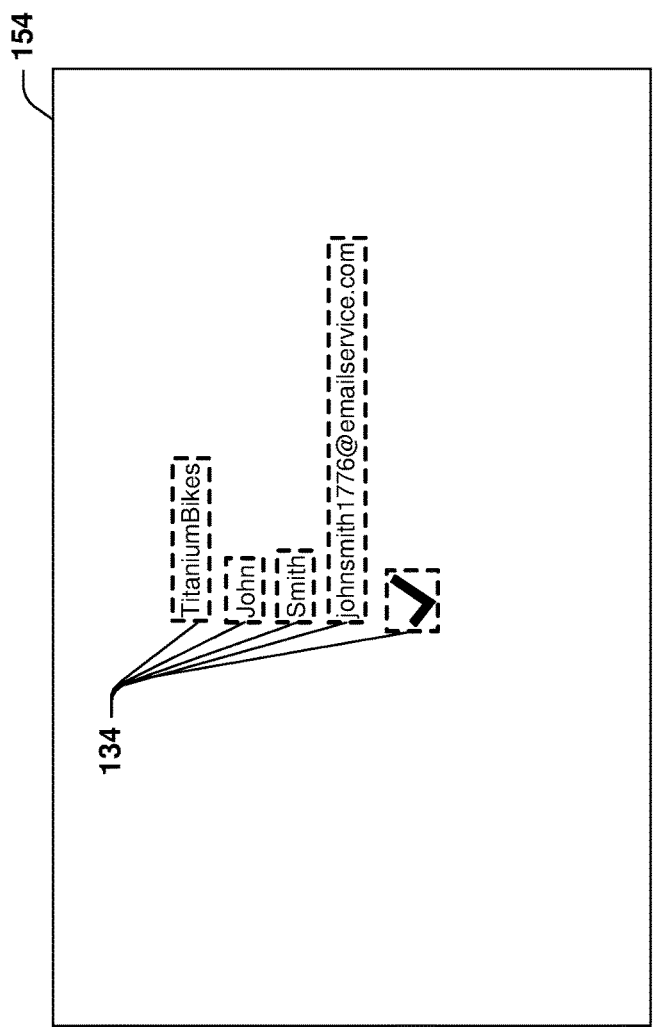
FIG. 1H is a diagram illustrating an example of a first set of difference region contours according to some embodiments.
Figure 1K:
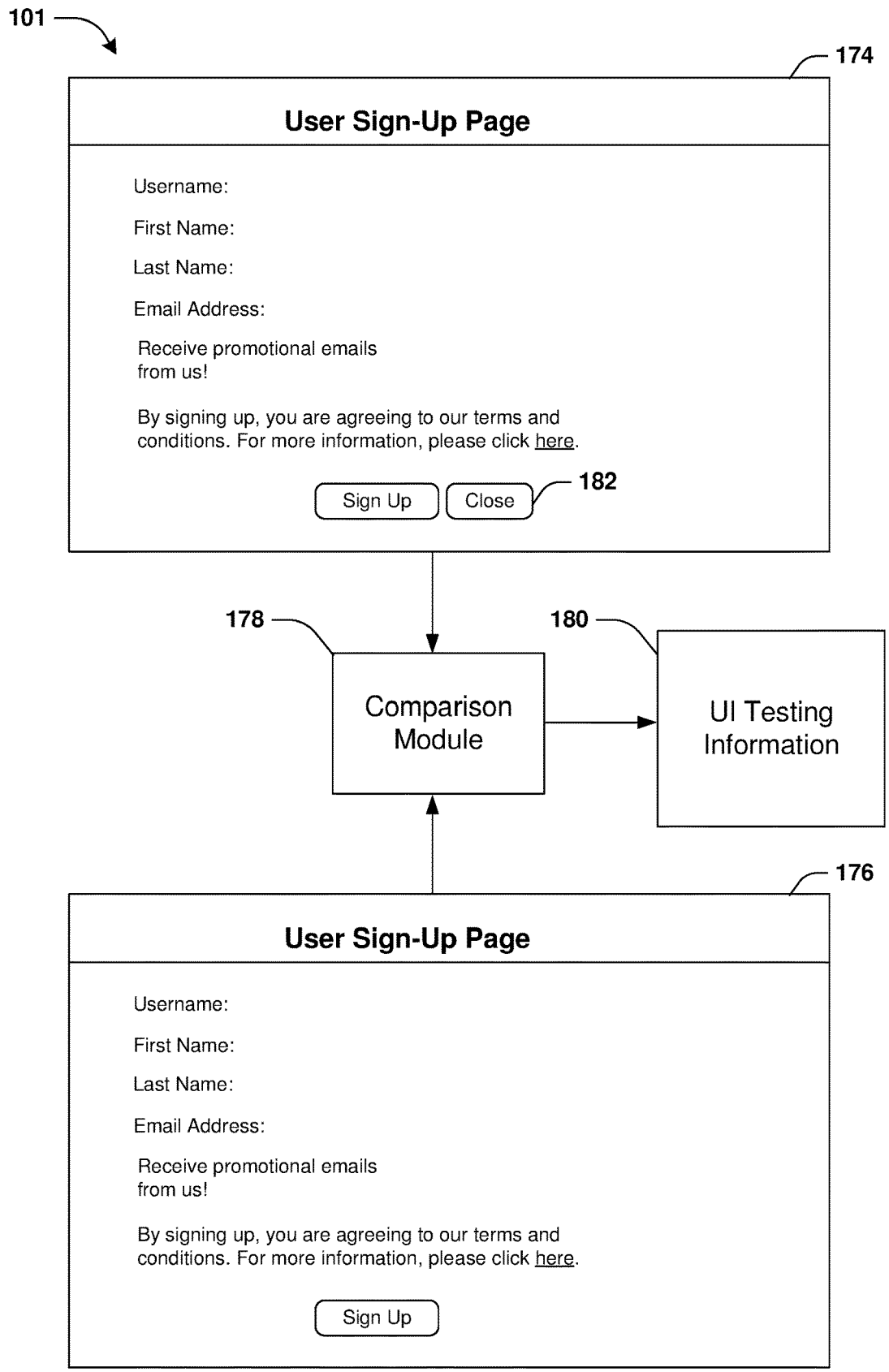
FIG. 1K is a diagram illustrating an example system for performing user interface testing, where user interface testing information is generated based upon a static portion of a fourth image and a static portion of a reference image according to some embodiments.
Figures 1L, 1M:
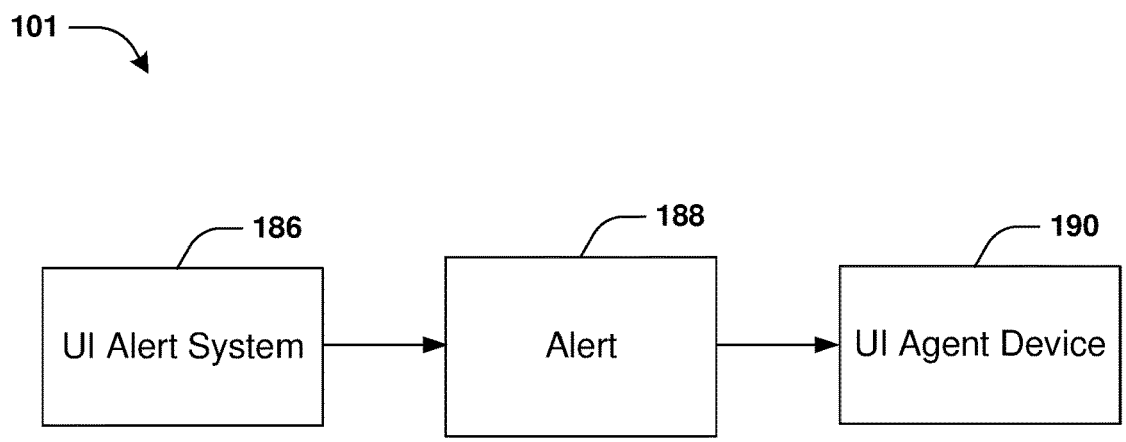
FIG. 1L is a diagram illustrating an example of a representation, of a fourth image, comprising an indication of a first user interface error according to some embodiments.
FIG. 1M is a diagram illustrating an example system for performing user interface testing, where an interface alert system transmits an alert to a user interface agent device according to some embodiments.
Figure 2:
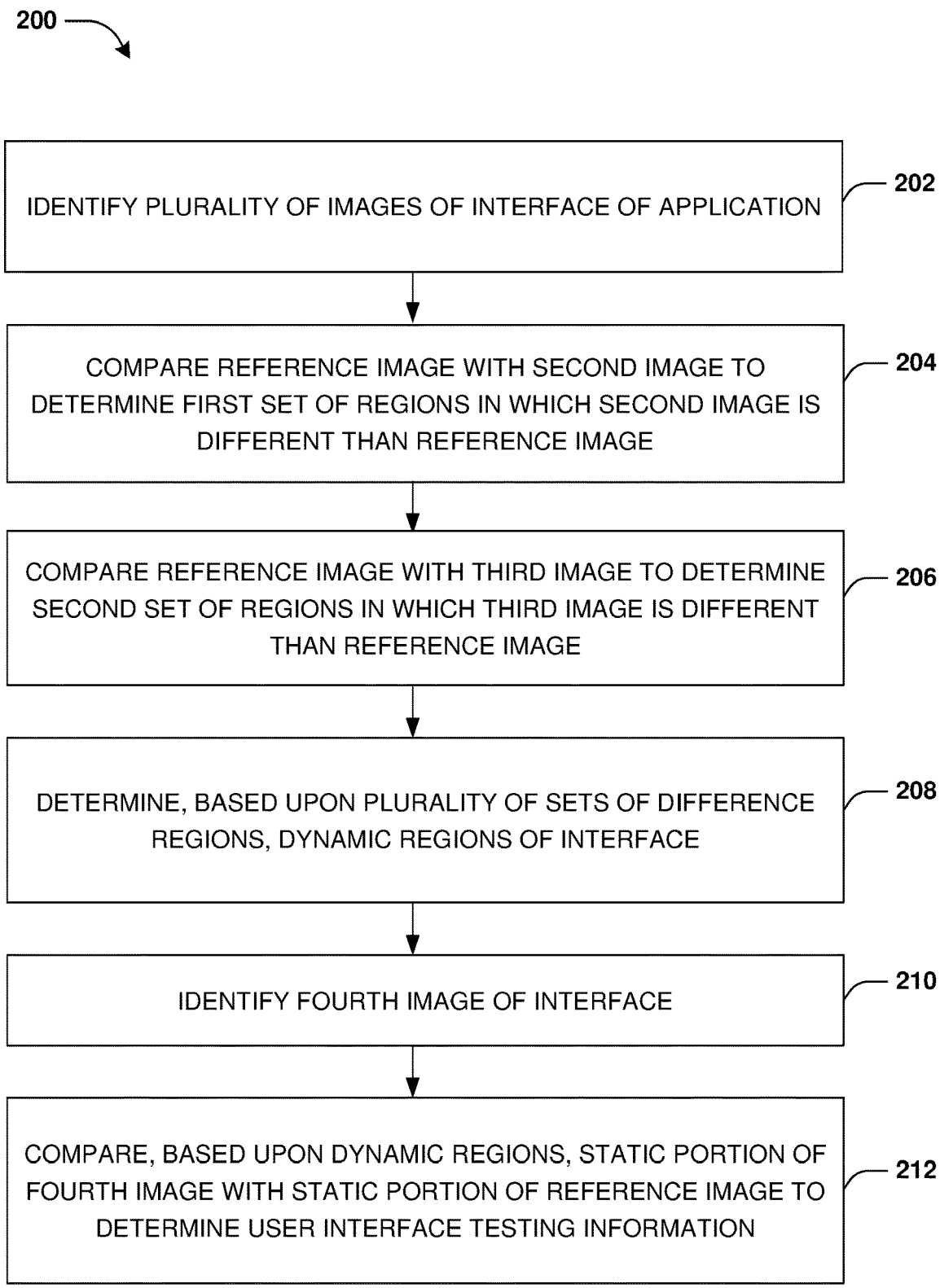
FIG. 2 is a flow chart illustrating an example method for performing user interface testing, according to some embodiments.

An embodiment of performing user interface testing is illustrated by an exemplary method 200 of FIG. 2, and is further described in conjunction with the system 101 of FIGS. 1A-1M. At 202, the first plurality of images of the first interface is identified. For example, the first plurality of images may be extracted from the screenshot data store 112 (e.g., the first plurality of images may be extracted from the first dataset 114, of the screenshot data store 112, associated with the first interface). The first plurality of images may be used to determine (e.g., learn) one or more dynamic regions of the first interface.

FIG. 1B illustrates determination of a set of dynamic regions (e.g., a set of one or more dynamic regions) of the first interface. For example, a set of dynamic region contours 138, indicative of the set of dynamic regions, may be generated. The set of dynamic region contours 138 may comprise boundaries of the set of dynamic regions. In some examples, the set of dynamic region contours 138 may be indicative of coordinates (e.g., positional coordinates, such as X coordinates and/or Y coordinates) of boundaries of the set of dynamic regions.

In some examples, the first plurality of images may comprise a reference image 124 (e.g., a base image with which other images are compared) and a second plurality of images 130 other than the reference image 124. The second plurality of images 130 may comprise some and/or all images, of the first plurality of images, other than the reference image 124. In some examples, the reference image 124 may be selected (to be used as a base image with which other images of the first plurality of images are compared, for example) from the first plurality of images in a random manner (e.g., using a true random function and/or a pseudo-random function). Alternatively and/or additionally, the reference image 124 may be selected from the first plurality of images based upon a determination that, among the first plurality of images, the reference image 124 was captured and/or generated earliest (e.g., the reference image 124 is the initially captured image of the first plurality of images). Alternatively and/or additionally, the reference image 124 may be selected from the first plurality of images based upon a determination that the reference image 124 is validated (e.g., validated as being screenshot of the first interface when the first interface is error-free), such as validated manually (by a user interface testing agent, for example) or validated automatically.

In some examples, the reference image 124 is compared with each image of the second plurality of images 130 to determine a plurality of sets of difference regions. For example, each set of difference regions of the plurality of sets of difference regions may comprise one or more regions, of the first interface, in which the reference image 124 is different than an image with which the reference image 124 is compared. The plurality of sets of difference regions may be determined by a comparison module 126. In an example, the comparison module 126 may generate a plurality of sets of difference region contours 132, wherein each set of difference region contours of the plurality of sets of difference region contours 132 is indicative of a set of difference regions of the plurality of sets of difference regions (e.g., the set of difference region contours may comprise boundaries of the set of difference regions).

At 204, the reference image 124 of the first plurality of images is compared (by the comparison module 126, for example) with a second image 128 of the second plurality of images 130 to determine a first set of difference regions, of the first interface, in which the second image 128 is different than the reference image 124. For example, the comparison module 126 may generate a first set of difference region contours 134, of the plurality of sets of difference region contours 132, indicative of the first set of difference regions (e.g., first set of one or more difference regions). In some examples, the first set of difference region contours 134 may be indicative of coordinates (e.g., positional coordinates, such as X coordinates and/or Y coordinates) of boundaries of the first set of difference regions.

At 206, the reference image 124 of the first plurality of images is compared (by the comparison module 126, for example) with a third image of the second plurality of images 130 to determine a second set of difference regions, of the first interface, in which the third image is different than the reference image 124. For example, the comparison module 126 may generate a second set of difference region contours, of the plurality of sets of difference region contours 132, indicative of the second set of difference regions (e.g., second set of one or more difference regions). In some examples, the second set of difference region contours may be indicative of coordinates (e.g., positional coordinates, such as X coordinates and/or Y coordinates) of boundaries of the second set of difference regions.

Accordingly, the plurality of sets of difference region contours 132 may comprise the first set of difference region contours 134 based upon the comparison of the reference image 124 with the second image 128, the second set of difference region contours based upon the comparison of the reference image 124 with the third image, and/or one or more other sets of difference region contours based upon one or more comparisons of the reference image 124 with one or more other images of the second plurality of images 130.

In some examples, at least some of the first plurality of images (comprising the reference image 124 and/or the second plurality of images 130) may be resized (prior to being compared to generate the plurality of sets of difference region contours 132, for example) such that images of the first plurality of images have at least one of the same size, the same number of pixels, the same dimensions, etc. In this way, the images of the first plurality of images are comparable to each other, and thus, the plurality of sets of difference region contours 132 may be generated accurately. In an example, each image of the first plurality of images may have the same size, such as a size of 1000 pixels×1000 pixels or other size (e.g., all images of the first plurality of images may be automatically resized to be the same size).

At 208, the set of dynamic regions is determined based upon the plurality of sets of difference regions. For example, the set of dynamic region contours 138 (indicative of boundaries of the set of dynamic regions) may be generated, by a dynamic region determination module 136, based upon the plurality of sets of difference region contours 132. In some examples, the set of dynamic regions comprises the plurality of sets of difference regions. For example, the plurality of sets of difference regions may be combined to determine the set of dynamic regions.

FIG. 10 illustrates an example of the reference image 124. In the example shown in FIG. 1C, the first interface of the first application corresponds to an interface, of the first application, for signing up for an account of the first application. The first interface of the first application may comprise one or more text fields, one or more identifications of the one or more text fields (e.g., the one or more identifications may comprise a first indication "Username" identifying a username text field to be used for entering a username of a user account, a second indication "First Name" identifying a first name text field to be used for entering a first name of a user of a user account, etc.), a check box (e.g., tick box) to be used for making a binary choice (e.g., whether or not to receive promotional emails), descriptive text, and/or one or more buttons (e.g., a sign up button and/or a close button).

FIG. 1D illustrates an example of the second image 128. The second image 128 may have one or more differences with the reference image 124. For example, in the second image 128, text may be displayed within one or more text fields of the first interface (e.g., "TitaniumBikes" may be within the username text field, "John" may be within the first name text field, etc.). For example, the text may be entered into the one or more text fields by the automated testing module 102. Alternatively and/or additionally, a check may be displayed overlaying the check box (e.g., the check may be displayed based upon a selection of the check box, wherein the check box may be selected by the automated testing module 102).

FIG. 1E illustrates generation of a difference image 154 based upon the reference image 124 and the second image 128. In some examples, the reference image 124 is converted to a first gray-scale image 148 and/or the second image 128 is converted to a second gray-scale image 150. The first gray-scale image 148 and/or the second gray-scale image 150 may be generated using a gray-scale conversion module 146. In some examples, the gray-scale conversion module 146 may convert a 3-dimensional image (e.g., 3 dimensions corresponding to Red Green Blue (RGB)) or a 4-dimensional image to a 2-dimensional image (e.g., black and white). In some examples, the gray-scale conversion module 146 may convert an image to a gray-scale image by applying a threshold to pixels of the image, such as where pixels that have a value that meets the threshold (e.g., a value larger than or equal to 128) is set to a first value and pixels that have a value that is less than the threshold (e.g., a value smaller than 128) is set to a second value (e.g., the first value and the second value may correspond to different colors, such as where the first value corresponds to black and the second value corresponds to white, or vice versa). Accordingly, the first gray-scale image 148 and/or the second gray-scale image 150 may be binary images with two colors, such as black and white.

In some examples, a comparison (e.g., a pixel to pixel comparison) of the first gray-scale image 148 and the second gray-scale image 150 may be performed to generate the difference image 154 representative of differences between the first gray-scale image 148 and the second gray-scale image 150. For example, the comparison (e.g., the pixel to pixel comparison) may be performed using a pixel to pixel comparison module 152. In some examples, the difference image 154 may be indicative of pixel locations at which pixels of the first gray-scale image 148 and pixels of the second gray-scale image 150 have different colors (and/or different shades of color). In some examples, converting the reference image 124 and the second image 128 to gray-scale images and/or using the gray-scale images to determine the pixel locations and/or generate the difference image 154 may result in increased accuracy of the determined pixel locations and/or the difference image 154 (as opposed to determining the pixel locations and/or the difference image 154 directly based upon the reference image 124 and the second image 128, for example). Embodiments are contemplated in which the gray-scale images are not generated and/or in which the pixel locations and/or the difference image 154 are determined directly based upon the reference image 124 and the second image 128.

FIG. 1F illustrates an example of the difference image 154 representative of differences between the first gray-scale image 148 and the second gray-scale image 150. For example, the difference image 154 may be indicative of pixel locations at which pixels of the first gray-scale image 148 and pixels of the second gray-scale image 150 have different colors (and/or different shades of color). In the example shown in FIG. 1F, the differences indicated by the difference image 154 correspond to text entered into one or more text fields of the first interface and/or the check displayed overlaying the check box. In some examples, the difference image 154 may be a binary image with two colors, such as black and white.

In some examples, the first set of difference regions (e.g., one or more regions of the first interface in which the second image 128 is different than the reference image 124) may be determined based upon the difference image 154 (e.g., the first set of difference region contours 134, indicative of the first set of difference regions, may be generated based upon the difference image 154).

FIG. 1G illustrates generation of the first set of difference region contours 134 based upon the difference image 154. In some examples, canny edge detection may be performed on the difference image 154 to determine (e.g., detect) edges of the difference image 154. For example, the canny edge detection may be performed by a canny edge detector 160 that outputs a canny edge image 162 representative of the edges of the difference image 154.

In some examples, the canny edge detection (performed on the difference image 154 to determine edges of the difference image 154) comprises removing (and/or reducing) noise in the difference image 154, such as using a Gaussian filter (e.g., a 5×5 Gaussian filter), to generate a noise-filtered image (e.g., a smoothened image). In some examples, the canny edge detection comprises filtering the noise-filtered image with a Sobel kernel in the horizontal direction and/or the vertical direction to generate a horizontal derivative image (corresponding to a derivative of the noise-filtered image in the horizontal direction) and/or a vertical derivative image (corresponding to a derivative of the noise-filtered image in the vertical direction). An edge gradient and/or direction for a pixel of the noise-filtered image may be determined based upon the horizontal derivative image and/or the vertical derivative image. For example, an edge gradient of a pixel of the noise-filtered image may be determined according to equation (1):

$$\text{Edge\_Gradient}(G) = \sqrt{G_x^2 + G_y^2}, \quad (1)$$

where G corresponds to the pixel, $G_x$ corresponds to a horizontal derivative of the pixel (as indicated by the horizontal derivative image, for example), and/or $G_y$ corresponds to a vertical derivative of the pixel (as indicated by the vertical derivative image, for example). In some examples, a direction of the pixel may be determined according to equation (2):

$$\text{Angle } (\theta) = \tan^{-1}\left(\frac{G_y}{G_x}\right). \quad (2)$$

In some examples, gradients (e.g., gradient magnitudes) and/or directions of some and/or all pixels of the noise-filtered image may be determined (according to equation (1) and/or equation (2), for example). Hysteresis thresholding may be performed to identify edge pixels (e.g., pixels corresponding to edges of the noise-filtered image) and/or non-edge pixels (e.g., pixels determined to not correspond to edges of the noise-filtered image). In some examples, gradients of pixels of the noise-filtered image may be compared with a first threshold (e.g., minVal) and/or a second threshold (e.g., maxVal). Pixels having gradients less than the first threshold may be determined to be non-edge pixels. Pixels having gradients larger than the second threshold may be determined to be edge pixels. In some examples, in response to a determination that a gradient of a pixel is between the first threshold and the second threshold, whether the pixel is an edge pixel or a non-edge pixel may be determined based upon a connectivity of the pixel. For example, the pixel (with the gradient between the first threshold and the second threshold) may be determined to be an edge pixel if the pixel is connected to a pixel (e.g., a sure-edge pixel) with a gradient larger than the second threshold. The pixel (with the gradient between the first threshold and the second threshold) may be determined to be a non-edge pixel if the pixel is not connected to a pixel with a gradient larger than the second threshold. In some examples, edge pixels are kept and/or non-edge pixels are discarded to generate the canny edge image 162. Alternatively and/or additionally, the edge pixels may be set to a first color in the canny edge image 162 and/or the non-edge pixels may be set to a second color in the canny edge image 162. In some examples, the canny edge image 162 may be a binary image with two colors, such as black and white. In an example, the first color is white and the second color is black. Alternatively and/or additionally, the first color may be black and the second color may be white. Other colors of the first color and/or the second color are within the scope of the present disclosure.

In some examples, the first threshold (e.g., minVal) may be different than the second threshold (e.g., maxVal), such as where the first threshold is smaller than the second threshold. In an example, the first threshold is 16 and the second threshold is 51. Other values of the first threshold and/or the second threshold are within the scope of the present disclosure.

In some examples, the first threshold (e.g., minVal) may be the same as the second threshold (e.g., maxVal). In an example, the first threshold and the second threshold are 128.

In some examples, the first set of difference region contours 134 may be generated based upon the canny edge image 162. For example, the first set of difference region contours 134 may be generated based upon edges indicated by the canny edge image 162. For example, the first set of difference region contours 134 may correspond to boundaries of one or more difference regions of the first set of difference regions. In some examples, the first set of difference region contours 134 may be generated by a contour detector 164 that receives the canny edge image 162 as an input and generates the first set of difference region contours 134 based upon the canny edge image 162. In some examples, the canny edge image 162 being a binary image with two colors provides for increased accuracy with which the first set of difference region contours 134 is generated by the contour detector 164. In some examples, the canny edge image 162 may comprise edges in white (and the rest of the canny edge image 162 in black, for example) to increase the accuracy with which the first set of difference region contours 134 is generated by the contour detector 164. Embodiments are contemplated in which rather than (or in addition to) the contour detector 164 generating the first set of difference region contours 134 based upon the canny edge image 162, the contour detector 164 generate the first set of difference region contours 134 based upon information different than the canny edge image 162, such as based upon information comprising the difference image 154. In an example in which the contour detector 164 generates the first set of difference region contours 134 based upon the difference image 154, the difference image 154 being a binary image with two colors provides for increased accuracy with which the first set of difference region contours 134 is generated by the contour detector 164. In some examples (such as where the contour detector 164 generates the first set of difference region contours 134 based upon the difference image 154), the difference image 154 may comprise representations of differences in white (and the rest of the difference image 154 in black, for example) to increase the accuracy with which the first set of difference region contours 134 is generated by the contour detector 164.

In some examples, the contour detector 164 detects a set of contours along boundaries of objects (e.g., edges) of the canny edge image 162. A contour of the set of contours may correspond to a curve (e.g., an irregular-shaped curve) joining continuous points (e.g., continuous points having the same color and/or the same intensity) along a boundary of an object (e.g., an edge) in the canny edge image 162. In some examples, the first set of difference region contours 134 is based upon the set of contours.

For example, the first set of difference region contours 134 may be the same as the set of contours. Alternatively and/or additionally, the set of contours may be modified to generate the first set of difference region contours 134. In some examples, a contour of the first set of difference region contours 134 is a rectangular-shaped contour that defines a region in which one or more contours of the set of contours is positioned. For example, one, some and/or all contours of the first set of difference region contours 134 may be rectangular-shaped contours. Generating the first set of difference region contours 134 may comprise converting irregular-shaped contours (e.g., the set of contours detected by the contour detector 164) to the first set of difference region contours 134 (e.g., rectangular-shaped contours). In an example, a rectangular-shaped contour of the first set of difference region contours 134 may be generated (e.g., drawn) based upon contour edges of one or more contours of the set of contours and/or one or more center points of the one or more contours. In some examples, a rectangular-shaped contour of the first set of difference region contours 134 may be indicative of coordinates (e.g., positional coordinates, such as X coordinates and/or Y coordinates) of a rectangle. It may be appreciated that generating the first set of difference regions 134 to be rectangular-shaped contours (and/or other shapes) provides for increased accuracy in generating the set of dynamic region contours 138. Alternatively and/or additionally, the first set of difference regions 134 (e.g., rectangular-shaped contours) may be increased in size (e.g., increased in length and/or width) so that the set of dynamic regions defined by the resulting set of dynamic region contours 138 (that is generated using the first set of difference regions 134 and/or other sets of difference regions) encompass a larger area of the first interface, thereby reducing the likelihood of detecting false positive errors in the first interface (that may otherwise be detected if the first set of difference regions 134 were the same as the set of contours detected by the contour detector 164, for example).

In some examples, the first set of difference region contours 134 is generated using one or more computer vision techniques. For example, the first set of difference region contours 134 may be generated using a contour detection function, such as a contour detection function of OpenCV.

FIG. 1H illustrates an example of the first set of difference region contours 134. For clarity, FIG. 1H shows the first set of difference region contours 134 overlaying the difference image 154 (so that positions of the contours are shown relative to the differences indicated by the difference image 154). Each contour of the first set of difference region contours 134 corresponds to a boundary of a region (of the first set of difference regions) in which the second image 128 is different than the reference image 124. Contours of the first set of difference region contours 134 may be generated to be rectangular.

In some examples, each set of difference region contours of one, some and/or all sets of difference region contours (other than the first set of difference region contours 134) of the plurality of sets of difference region contours 132 may be generated using one or more of the techniques provided herein with respect to generating the first set of difference region contours 134. For example, a plurality of iterations may be performed to (iteratively) generate the plurality of set of difference region contours 132. In some examples, each iteration of the plurality of iterations comprises comparing an image of the second plurality of images 130 with the reference image 124 to determine a set of difference region contours. In some examples, upon completion of each iteration of the plurality of iterations, a determined set of difference region contours may be added to a list of difference region contours that is used for generating and/or updating the set of dynamic region contours 138. For example, upon completion of the plurality of iterations, the list of difference region contours may comprise the plurality of sets of difference region contours 132.

In some examples, the set of dynamic region contours 138 (indicative of boundaries of the set of dynamic regions) is generated based upon the plurality of sets of difference region contours 132. For example, the set of dynamic region contours 138 may be generated based upon coordinates (e.g., positional coordinates, such as X coordinates and/or Y coordinates) of difference region contours of the plurality of sets of difference region contours 132. In some examples, the plurality of sets of difference regions may be combined to determine the set of dynamic regions (e.g., the set of dynamic regions may correspond to a combination, such as a sum, of the plurality of sets of difference regions). In some examples, the set of dynamic region contours 138 may be generated such that regions (e.g., dynamic regions) within the set of dynamic region contours 138 comprise difference regions (e.g., all difference regions) indicated by the plurality of sets of difference region contours 132. For example, the set of dynamic region contours 138 may be generated such that the regions (e.g., dynamic regions) within the set of dynamic region contours 138 comprise the first set of difference regions determined based upon a comparison of the reference image 124 with the second image 128, the second set of difference regions determined based upon a comparison of the reference image 124 with the third image, and/or other sets of difference regions determined based upon comparisons of the reference image 124 with other images of the second plurality of images 130. In this way, regions (e.g., difference regions) in which differences in the first interface are detected may be indicated as being dynamic by the set of dynamic region contours 138. In some examples, a contour of the set of dynamic region contours 138 may be generated to have a rectangular shape.

FIG. 1I illustrates an example of the set of dynamic region contours 138. For clarity, FIG. 1I shows the first set of dynamic region contours 138 overlaying the reference image 124 (so that positions of the contours are shown relative to the reference image 124). As shown in FIG. 1I, the first set of dynamic region contours 138 may correspond to boundaries of dynamic regions comprising text fields of the first interface (in which text can be entered and displayed) and/or the check box of the first interface (in which a check can be entered and displayed).

In some examples, after the set of dynamic region contours 138 is initially generated and/or used for user interface testing, the set of dynamic region contours 138 may be updated based upon received images (e.g., newly received screenshots of the first interface from the automated testing module 102). For example, in response to a received image (e.g., a newly received screenshot of the first interface from the automated testing module 102), a set of difference region contours may be generated based upon a comparison of the received image with the reference image 124 (such as using one or more of the techniques provided herein with respect to generating the first set of difference region contours 134), wherein the set of difference region contours may be used to update the set of dynamic region contours 138, thus providing for increased accuracy of the set of dynamic region contours 138 and/or user interface testing performed using the set of dynamic region contours 138.

At 210, a fourth image of the first interface may be identified. In some examples, the fourth image of the first interface may comprise a screenshot of the first interface captured via one or more second automated tests of the first application. For example, the one or more second automated tests may be executed by a second automated testing module. The second automated testing module may be the same as or different than the automated testing module 102. The one or more second automated tests may comprise at least one of one or more regression tests, one or more progression tests, one or more functional tests, etc. In some examples, the one or more second automated tests may be performed as part of a testing function that is executed on the first application periodically to ensure that the first application functions properly over time. Alternatively and/or additionally, the one or more second automated tests may be performed after a (new) feature is implemented (e.g., added) in the first application to check whether or not implementation of the feature has an unintended and/or detrimental impact on one or more interfaces of the first application. Alternatively and/or additionally, the one or more second automated tests may be performed after a (new) version of the first application is implemented, such as after a (new) application build is implemented, after a (new) release of the first application is implemented, and/or after an application update of the first application is implemented. Embodiments are contemplated in which the fourth image comprises a screenshot that is captured using other techniques (e.g., the screenshot may be captured manually and/or may be captured while one or more users are interacting with the user interface of the first application). In some examples, the screenshot (e.g., the fourth image) may be captured after a (new) feature is implemented (e.g., added) in the first application, after a (new) version of the first application is implemented, after a (new) application build is implemented, after a (new) release of the first application is implemented, and/or after an application update of the first application is implemented.

FIG. 1J illustrates an example of the fourth image (shown with reference number 172) of the first interface. In the fourth image 172, text may be displayed within one or more text fields of the first interface (e.g., "Timtasticbikes" may be within the username text field, "Tim" may be within the first name text field, etc.). For example, the text may be entered into the one or more text fields by the second automated testing module.

At 212, based upon the set of dynamic regions (indicated by the set of dynamic region contours 138), a static portion of the fourth image 172 may be compared with a static portion of the reference image 124 to determine user interface testing information associated with the first interface of the first application. For example, the static portion of the reference image 124 and/or the static portion of the fourth image 172 may correspond to a set of static regions (e.g., a set of one or more static regions) of the first interface. The set of static regions may comprise one or more regions of the first interface different than (e.g., separate from) the set of dynamic regions. For example, the set of static regions may comprise a region of the first interface that is configured to be static (e.g., unchanging) and/or that is configured to change less frequently than dynamic regions of the first interface. By comparing the static portion of the fourth image 172 with the static portion of the reference image 124, it may be determined whether or not there is a difference, in the set of static regions of the first interface, between the fourth image 172 and the reference image 124.

In some examples, comparing the static portion of the fourth image 172 with the static portion of the reference image 124 comprises: (i) removing a dynamic portion, of the fourth image 172, corresponding to the set of dynamic regions to generate a fifth image (and/or setting the dynamic portion of the fourth image 172 to a predefined color to generate the fifth image); (ii) removing a dynamic portion, of the reference image 124, corresponding to the set of dynamic regions to generate a sixth image (and/or setting the dynamic portion of the reference image 124 to a predefined color to generate the sixth image); and/or (iii) comparing the fifth image with the sixth image to determine the user interface testing information.

FIG. 1K illustrates the static portion of the fourth image 172 being compared with the static portion of the reference image 124 to determine the user interface testing information (shown with reference number 180). In the example shown in FIG. 1K, the fifth image (shown with reference number 176) may be compared with the sixth image 174 using a second comparison module 178. The second comparison module 178 may be the same as or different than the comparison module 126.

The fifth image 176 comprises the static portion, of the fourth image 172, corresponding to the set of static regions of the first interface. The fifth image 176 may exclude the dynamic portion, of the fourth image 172, corresponding to the set of dynamic regions of the first interface (e.g., the text fields and/or the check box of the first interface are not included in the fifth image 176).

The sixth image 174 comprises the static portion, of the reference image 124, corresponding to the set of static regions of the first interface. The sixth image 174 may exclude the dynamic portion, of the reference image 124, corresponding to the set of dynamic regions of the first interface (e.g., the text fields and/or the check box of the first interface are not included in the sixth image 174).

In some examples, the user interface testing information 180 is indicative of whether or not the first interface has a user interface error. A user interface error may be detected via detection of a difference between the fifth image 176 (comprising the static portion of the fourth image 172) and the sixth image 174 (comprising the static portion of the reference image 124). It may be appreciated that by comparing the fifth image 176 (comprising the static portion of the fourth image 172 and excluding the dynamic portion of the fourth image 172, for example) with the sixth image 174 (comprising the static portion of the reference image 124 and excluding the dynamic portion of the reference image 124, for example) to generate the user interface testing information 180, a user interface error of the first interface may be detected with increased accuracy compared to a system (and/or person) that does not differentiate between dynamic regions and static regions of interfaces that are tested. The increased accuracy of the user interface testing information 180 may be due, at least in part, to the second comparison module 178 focusing on the set of static regions of the first interface to detect potential user interface errors. For example, not differentiating between dynamic regions and static regions of interfaces that are tested may result in detection of false-positive errors based on differences between dynamic regions of an interface, where the false-positive errors may require an agent to manually check the false-positive error, thus leading to a waste of time and/or resources. However, in accordance with one or more of the embodiments provided herein, even where there is a difference in dynamic regions of the first interface (e.g., as shown in FIG. 1O and FIG. 1J, there is a difference between the reference image 124 and the fourth image 172 in the text fields of the first interface), a false-positive error is not detected due to differences in dynamic regions of the first interface being disregarded when determining the user interface testing information 180.

In some examples, the user interface testing information 180 may be indicative of a first user interface error of the first interface (detected in the fourth image 172 and/or the fifth image 176, for example). The first user interface error may be determined based upon detection of a difference between the static portion of the fourth image 172 (included in the fifth image 176, for example) and the static portion of the reference image 124 (included in the sixth image 174, for example). In an example, the difference between the fifth image 176 and the sixth image 174 may be detected by comparing the fifth image 176 with the sixth image 174 (via pixel to pixel comparison, for example). In some examples, the difference may comprise at least one of a feature (e.g., a graphical object, a button, text, etc.) of the first interface having an incorrect size, an incorrect position, an incorrect color, etc. in the fourth image 172 and/or the feature not being displayed in the fourth image 172. In the example shown in FIG. 1K, the difference may correspond to a lack of a button 182 of the first interface in the fourth image 172, whereas the reference image 124 of the first interface displays the button 182. For example, due to an error of the first application (e.g., an error caused by modification to software of the first application, such as in an update of the first application) the button 182 may not be rendered by the first interface when the fourth image 172 of the first interface is captured (via the one or more second automated tests, for example). In some examples, determining the user interface testing information 180 based upon the fourth image 172 may be performed to validate the first interface and/or to check whether or not the modification to the software of the first application (e.g., an update implemented on the first application) causes one or more errors on the user interface of the first interface. For example, the user interface testing information 180 may be performed in a user interface test (e.g., a regression test) performed (to validate the first interface, for example) in response to the first application being modified and/or an update being implemented on the first application.

The user interface testing information 180 may comprise a representation, of the fourth image 172, comprising an indication of the first user interface error. FIG. 1L illustrates an example of the representation (shown with reference number 183). The representation 183 may comprise an indication 184 of an area associated with the first user interface error (e.g., the area may correspond to an area in which the difference between the fourth image 172 and the reference image 124 is detected). Accordingly, a viewer of the representation 183 may quickly and/or conveniently identify the first user interface error (e.g., the viewer may quickly and/or conveniently determine that the button 182 of the first interface is not rendered).

In some examples, the user interface testing information 180 may indicate that the first interface has a user interface error based upon a determination that a similarity score, associated with a similarity between the static portion of the fourth image 172 and the static portion of the reference image 124, is less than a threshold similarity score. The second comparison module 178 may determine the similarity score (using one or more image processing techniques, for example) based upon the fifth image 176 (comprising the static portion of the fourth image 172, for example) and the sixth image 174 (comprising the static portion of the reference image 124, for example). In some examples, the similarity score comprises a Structural Similarity Index (SSIM) score. The similarity score may be determined based upon one or more properties (e.g., features) comprising at least one of a luminance of the fifth image 176, a contrast of the fifth image 176, a structure of the fifth image 176, a luminance of the sixth image 174, a contrast of the sixth image 174, a structure of the sixth image 174, etc. The one or more properties may be extracted from the fifth image 176 and/or the sixth image 174. In some examples, the SSIM score may be determined according to equation (3)

$$SSIM(x, y) = \frac{(2\mu_x\mu_y + c_1)(2\sigma_{xy} + c_2)}{(\mu_x^2 + \mu_y^2 + c_1)(\sigma_x^2 + \sigma_y^2 + c_2)}, \quad (3)$$

where x corresponds to at least a portion of the fifth image 176, y corresponds to at least a portion of the sixth image 174, $\mu_x$ corresponds to the average of x, $\mu_y$ corresponds to the average of y, a corresponds to the variance of x, $\sigma_y^2$ corresponds to the variance of y, $\sigma_x^2$ corresponds to the covariance of x and y, $c_1=(k_1L)^2$, $c_2=(k_2L)^2$ (e.g., $c_1$ and/or $c_2$ may be variables to stabilize division with a weak denominator), L corresponds to the dynamic range of the pixel-values (e.g., $2^{\#bits\ per\ pixel}-1$), $k_1=0.01$ (or other value) and/or $k_2=0.03$ (or other value). In some examples, the second comparison module 178 may determine that there is a user interface error in the first interface (and/or may include an indication of the user interface error in the user interface testing information 180) based upon a determination that the similarity score (e.g., the SSIM score) is less than the similarity threshold (e.g., a SSIM score threshold). The similarity score (e.g., the SSIM score) may be a value from 0 to 1. In an example, the similarity threshold (e.g., the SSIM score threshold) is a value from 0.90000 to 0.99999 (e.g., the similarity threshold may be 0.900, 0.999 or a value between 0.90000 and 0.99999). Other values of the similarity threshold are within the scope of the present disclosure.

In some examples, one or more corrective actions may be performed based upon detection of one or more user interface errors (e.g., the first user interface error and/or one or more other user interface errors) in the first interface of the first application. For example, the one or more corrective actions may comprise transmitting an alert to one or more agents (e.g., testing agents tasked with testing and/or maintaining the first application). FIG. 1M illustrates a user interface alert system 186 transmitting the alert (shown with reference number 188) to a user interface agent device 190 (e.g., a device belonging to an agent tasked with maintaining and/or testing the first application). The alert 188 may comprise the user interface testing information 180. The user interface testing information 180 may be indicative of the one or more user interface errors and/or may be indicative of instructions to fix the one or more user interface errors such that the agent can quickly and/or conveniently fix the one or more user interface errors based upon the user interface testing information 180.

Alternatively and/or additionally, the one or more corrective actions may comprise modifying (e.g., automatically modifying) the first application to fix the one or more user interface errors. In an example in which the one or more user interface errors comprises the button 182 not rendering in the first interface, the one or more corrective actions may comprise modifying the first application (e.g., adding code to a program of the first application, removing code from a program of the first application, modifying code of a program of the first application, etc.) such that the button 182 renders in the first interface.

In some examples, using one or more of the techniques provided herein with respect to the first interface, user interface testing can be performed for one, some and/or all interfaces of the first application. Accordingly, the user interface of some and/or all interfaces of the first application may be tested and/or validated automatically and/or one or more detected user interface errors may be fixed automatically. In some examples, using one or more of the techniques provided herein, a user interface test (e.g., a regression test) may be performed for some and/or all interfaces of the first application in response to the first application being modified and/or an update being implemented on the first application.

According to some embodiments, a method is provided. The method includes identifying a plurality of images of an interface of an application; comparing a first image of the plurality of images with a second image of the plurality of images to determine a first set of regions, of the interface, in which the second image is different than the first image; comparing the first image with a third image of the plurality of images to determine a second set of regions, of the interface, in which the third image is different than the first image; determining, based upon the first set of regions and the second set of regions, a set of dynamic regions of the interface; identifying a fourth image of the interface; and comparing, based upon the set of dynamic regions, a first portion of the fourth image with a first portion of the first image to determine user interface testing information associated with the interface of the application.

According to some embodiments, the set of dynamic regions include the first set of regions and the second set of regions.

According to some embodiments, the first portion of the first image corresponds to a set of static regions, of the interface, different than the set of dynamic regions of the interface; and the first portion of the fourth image corresponds to the set of static regions of the interface.

According to some embodiments, the user interface testing information is indicative of whether or not the interface has a user interface error.

According to some embodiments, the user interface testing information indicates that the interface has a user interface error based upon a determination that a similarity score associated with a similarity between the first portion of the first image and the first portion of the fourth image is less than a threshold.

According to some embodiments, the similarity score includes a Structural Similarity Index (SSIM) score.

According to some embodiments, the user interface testing information is indicative of a region, in the set of static regions of the interface, in which in the fourth image is different than the first image.

According to some embodiments, comparing the first image with the second image to determine the first set of regions of the interface includes: converting the first image to a first gray-scale image; converting the second image to a second gray-scale image; performing a pixel to pixel comparison of the first gray-scale image with the second gray-scale image to generate a difference image representative of differences between the first gray-scale image and the second gray-scale image; and determining the first set of regions based upon the difference image.

According to some embodiments, determining the first set of regions based upon the difference image includes: determining edges of the difference image using canny edge detection; and determining contours of the first set of regions based upon the edges.

According to some embodiments, the method includes resizing the first image and the second image to have a first size.

According to some embodiments, the plurality of images includes screenshots captured via execution of one or more automated tests on the application.

According to some embodiments, a non-transitory computer-readable medium, storing instructions that when executed perform operations, is provided. The operations include identifying a plurality of images of an interface of an application; comparing a first image of the plurality of images with a second image of the plurality of images to determine a first set of regions, of the interface, in which the second image is different than the first image; comparing the first image with a third image of the plurality of images to determine a second set of regions, of the interface, in which the third image is different than the first image; determining, based upon the first set of regions and the second set of regions, a set of dynamic regions of the interface; identifying a fourth image of the interface; and comparing, based upon the set of dynamic regions, a first portion of the fourth image with a first portion of the first image to determine user interface testing information associated with the interface of the application.

According to some embodiments, the set of dynamic regions include the first set of regions and the second set of regions.

According to some embodiments, the first portion of the first image corresponds to a set of static regions, of the interface, different than the set of dynamic regions of the interface; and the first portion of the fourth image corresponds to the set of static regions of the interface.

According to some embodiments, the user interface testing information is indicative of whether or not the interface has a user interface error.

According to some embodiments, a device is provided. The device includes a processor coupled to memory, the processor configured to execute instructions to perform operations. The operations include identifying a plurality of images of an interface of an application; comparing a first image of the plurality of images with a second image of the plurality of images to determine a first set of regions, of the interface, in which the second image is different than the first image; comparing the first image with a third image of the plurality of images to determine a second set of regions, of the interface, in which the third image is different than the first image; determining, based upon the first set of regions and the second set of regions, a set of dynamic regions of the interface; identifying a fourth image of the interface; and comparing, based upon the set of dynamic regions, a first portion of the fourth image with a first portion of the first image to determine user interface testing information associated with the interface of the application.

According to some embodiments, the set of dynamic regions include the first set of regions and the second set of regions.

According to some embodiments, the first portion of the first image corresponds to a set of static regions, of the interface, different than the set of dynamic regions of the interface; and the first portion of the fourth image corresponds to the set of static regions of the interface.

According to some embodiments, the user interface testing information is indicative of whether or not the interface has a user interface error.

According to some embodiments, the user interface testing information indicates that the interface has a user interface error based upon a determination that a similarity score associated with a similarity between the first portion of the first image and the first portion of the fourth image is less than a threshold.

Figure 3:
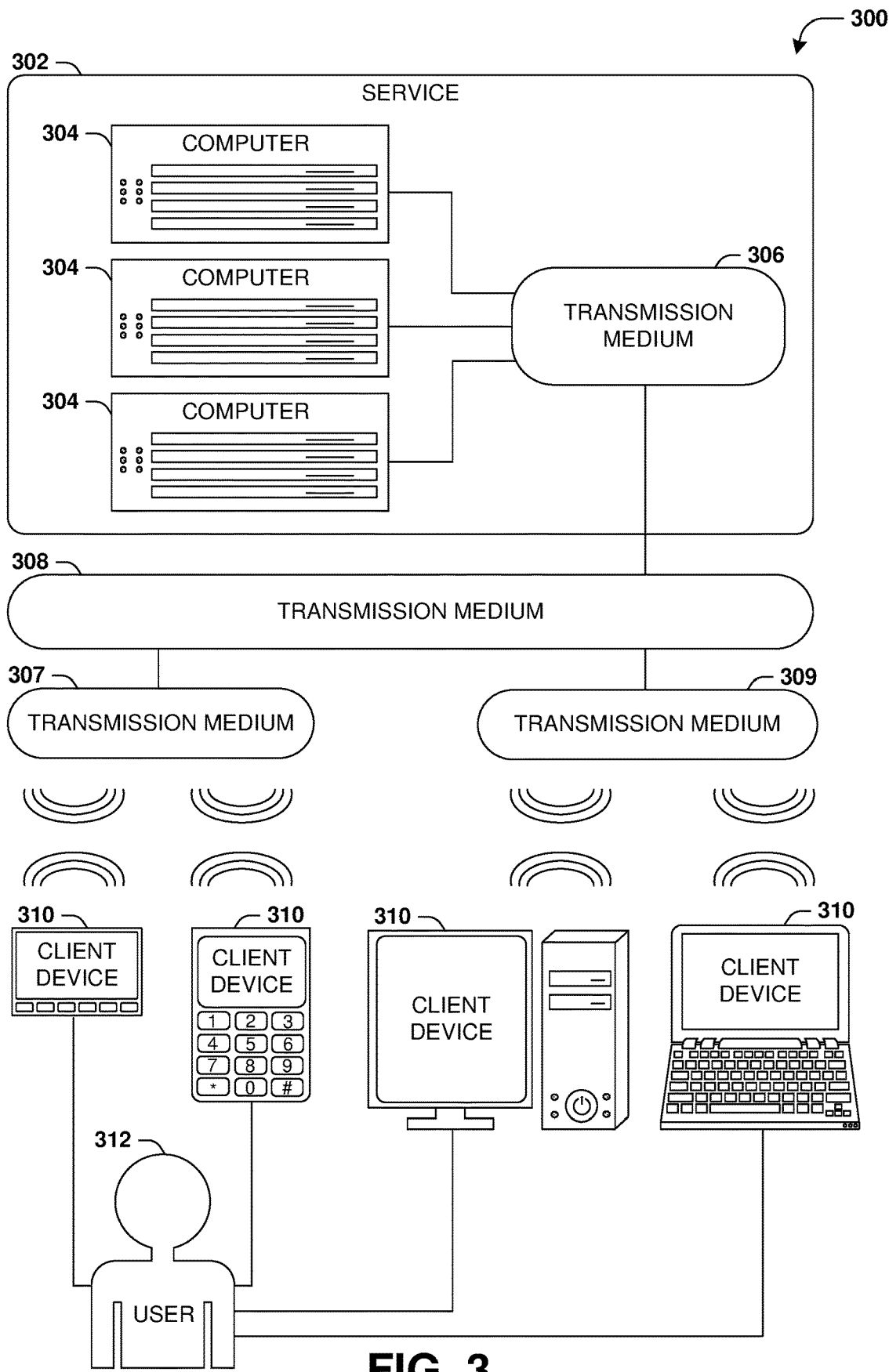
FIG. 3 is an illustration of a scenario involving various examples of transmission mediums that may be used to communicatively couple computers and clients.

FIG. 3 is an interaction diagram of a scenario 300 illustrating a service 302 provided by a set of computers 304 to a set of client devices 310 (e.g., UEs) via various types of transmission mediums. The computers 304 and/or client devices 310 may be capable of transmitting, receiving, processing, and/or storing many types of signals, such as in memory as physical memory states.

The computers 304 of the service 302 may be communicatively coupled together, such as for exchange of communications using a transmission medium 306. The transmission medium 306 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 302.

Likewise, the transmission medium 306 may comprise one or more sub-networks, such as may employ different architectures, may be compliant or compatible with differing protocols and/or may interoperate within the transmission medium 306. Additionally, various types of transmission medium 306 may be interconnected (e.g., a router may provide a link between otherwise separate and independent transmission medium 306).

In scenario 300 of FIG. 3, the transmission medium 306 of the service 302 is connected to a transmission medium 308 that allows the service 302 to exchange data with other services 302 and/or client devices 310. The transmission medium 308 may encompass various combinations of devices with varying levels of distribution and exposure, such as a public wide-area network and/or a private network (e.g., a virtual private network (VPN) of a distributed enterprise).

In the scenario 300 of FIG. 3, the service 302 may be accessed via the transmission medium 308 by a user 312 of one or more client devices 310, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 310 may communicate with the service 302 via various communicative couplings to the transmission medium 308. As a first such example, one or more client devices 310 may comprise a cellular communicator and may communicate with the service 302 by connecting to the transmission medium 308 via a transmission medium 307 provided by a cellular provider. As a second such example, one or more client devices 310 may communicate with the service 302 by connecting to the transmission medium 308 via a transmission medium 309 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the computers 304 and the client devices 310 may communicate over various types of transmission mediums.

Figure 4:
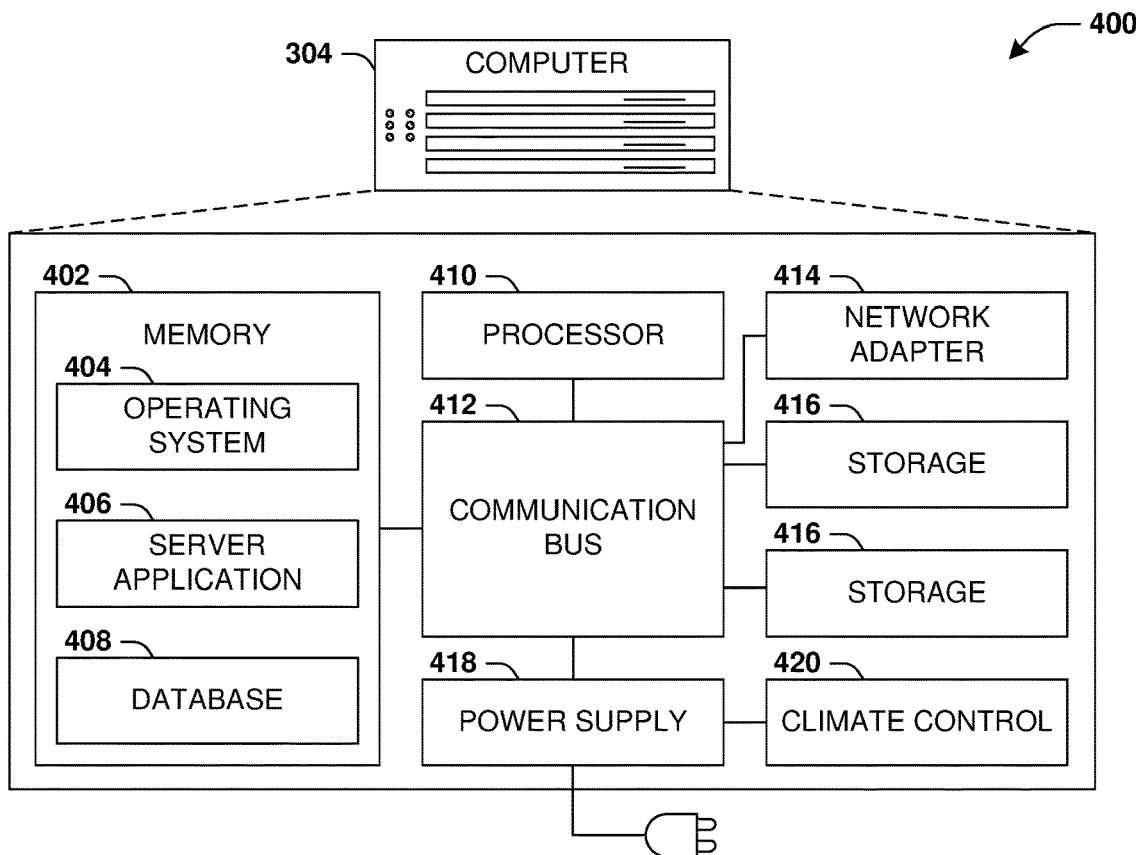
FIG. 4 is an illustration of a scenario involving an example configuration of a computer that may utilize and/or implement at least a portion of the techniques presented herein.

FIG. 4 presents a schematic architecture diagram 400 of a computer 304 that may utilize at least a portion of the techniques provided herein. Such a computer 304 may vary widely in configuration or capabilities, alone or in conjunction with other computers, in order to provide a service such as the service 302.

The computer 304 may comprise one or more processors 410 that process instructions. The one or more processors 410 may optionally include a plurality of cores; one or more coprocessors, such as a mathematics coprocessor or an integrated graphical processing unit (GPU); and/or one or more layers of local cache memory. The computer 304 may comprise memory 402 storing various forms of applications, such as an operating system 404; one or more computer applications 406; and/or various forms of data, such as a database 408 or a file system. The computer 304 may comprise a variety of peripheral components, such as a wired and/or wireless network adapter 414 connectible to a local area network and/or wide area network; one or more storage components 416, such as a hard disk drive, a solid-state storage device (SSD), a flash memory device, and/or a magnetic and/or optical disk reader.

The computer 304 may comprise a mainboard featuring one or more communication buses 412 that interconnect the processor 410, the memory 402, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 412 may interconnect the computer 304 with at least one other computer. Other components that may optionally be included with the computer 304 (though not shown in the schematic architecture diagram 400 of FIG. 4) include a display; a display adapter, such as a graphical processing unit (GPU); input peripherals, such as a keyboard and/or mouse; and a flash memory device that may store a basic input/output system (BIOS) routine that facilitates booting the computer 304 to a state of readiness.

The computer 304 may operate in various physical enclosures, such as a desktop or tower, and/or may be integrated with a display as an "all-in-one" device. The computer 304 may be mounted horizontally and/or in a cabinet or rack, and/or may simply comprise an interconnected set of components. The computer 304 may comprise a dedicated and/or shared power supply 418 that supplies and/or regulates power for the other components. The computer 304 may provide power to and/or receive power from another computer and/or other devices. The computer 304 may comprise a shared and/or dedicated climate control unit 420 that regulates climate properties, such as temperature, humidity, and/or airflow. Many such computers 304 may be configured and/or adapted to utilize at least a portion of the techniques presented herein.

Figure 5:
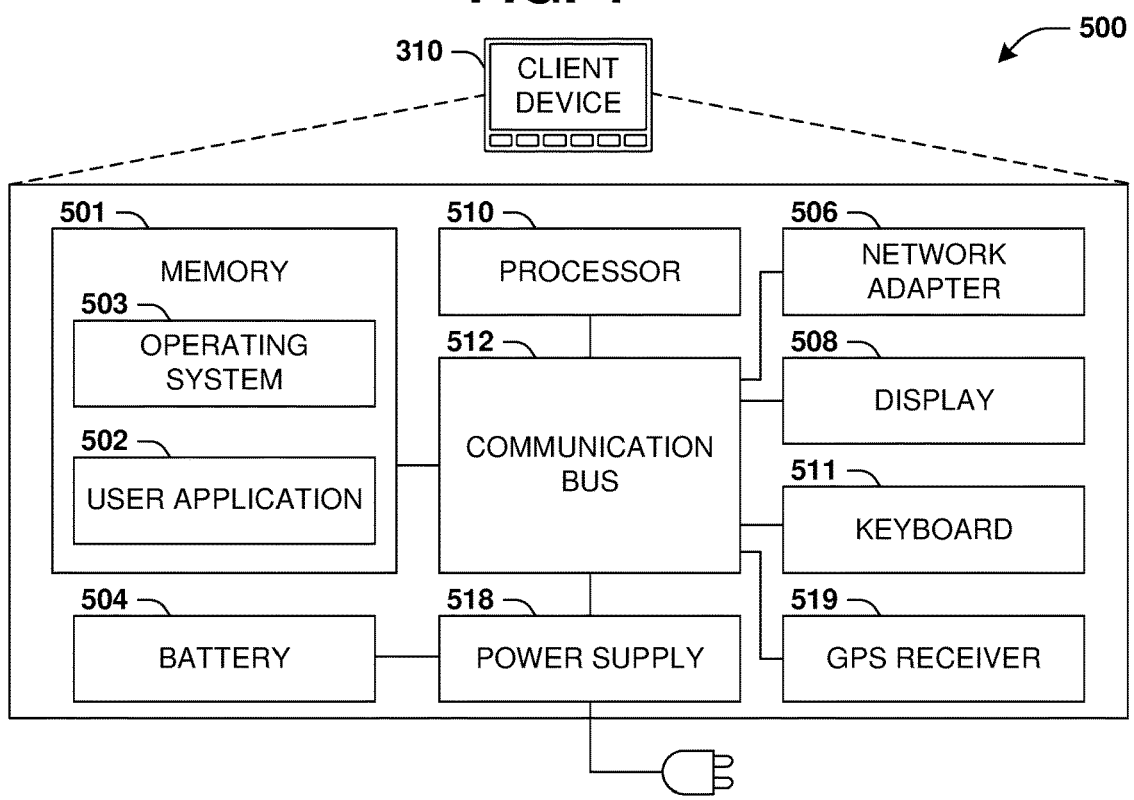
FIG. 5 is an illustration of a scenario involving an example configuration of a client that may utilize and/or implement at least a portion of the techniques presented herein.

FIG. 5 presents a schematic architecture diagram 500 of a client device 310 whereupon at least a portion of the techniques presented herein may be implemented. Such a client device 310 may vary widely in configuration or capabilities, in order to provide a variety of functionality to a user such as the user 312. The client device 310 may be provided in a variety of form factors, such as a desktop or tower workstation; an "all-in-one" device integrated with a display 508; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 310 may serve the user in a variety of roles, such as a workstation, kiosk, media player, gaming device, and/or appliance.

The client device 310 may comprise one or more processors 510 that process instructions. The one or more processors 510 may optionally include a plurality of cores; one or more coprocessors, such as a mathematics coprocessor or an integrated graphical processing unit (GPU); and/or one or more layers of local cache memory. The client device 310 may comprise memory 501 storing various forms of applications, such as an operating system 503; one or more user applications 502, such as document applications, media applications, file and/or data access applications, communication applications such as web browsers and/or email clients, utilities, and/or games; and/or drivers for various peripherals. The client device 310 may comprise a variety of peripheral components, such as a wired and/or wireless network adapter 506 connectible to a local area network and/or wide area network; one or more output components, such as a display 508 coupled with a display adapter (optionally including a graphical processing unit (GPU)), a sound adapter coupled with a speaker, and/or a printer; input devices for receiving input from the user, such as a keyboard 511, a mouse, a microphone, a camera, and/or a touch-sensitive component of the display 508; and/or environmental sensors, such as a global positioning system (GPS) receiver 519 that detects the location, velocity, and/or acceleration of the client device 310, a compass, accelerometer, and/or gyroscope that detects a physical orientation of the client device 310. Other components that may optionally be included with the client device 310 (though not shown in the schematic architecture diagram 500 of FIG. 5) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 310 to a state of readiness; and a climate control unit that regulates climate properties, such as temperature, humidity, and airflow.

The client device 310 may comprise a mainboard featuring one or more communication buses 512 that interconnect the processor 510, the memory 501, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 310 may comprise a dedicated and/or shared power supply 518 that supplies and/or regulates power for other components, and/or a battery 504 that stores power for use while the client device 310 is not connected to a power source via the power supply 518. The client device 310 may provide power to and/or receive power from other client devices.

Figure 6:
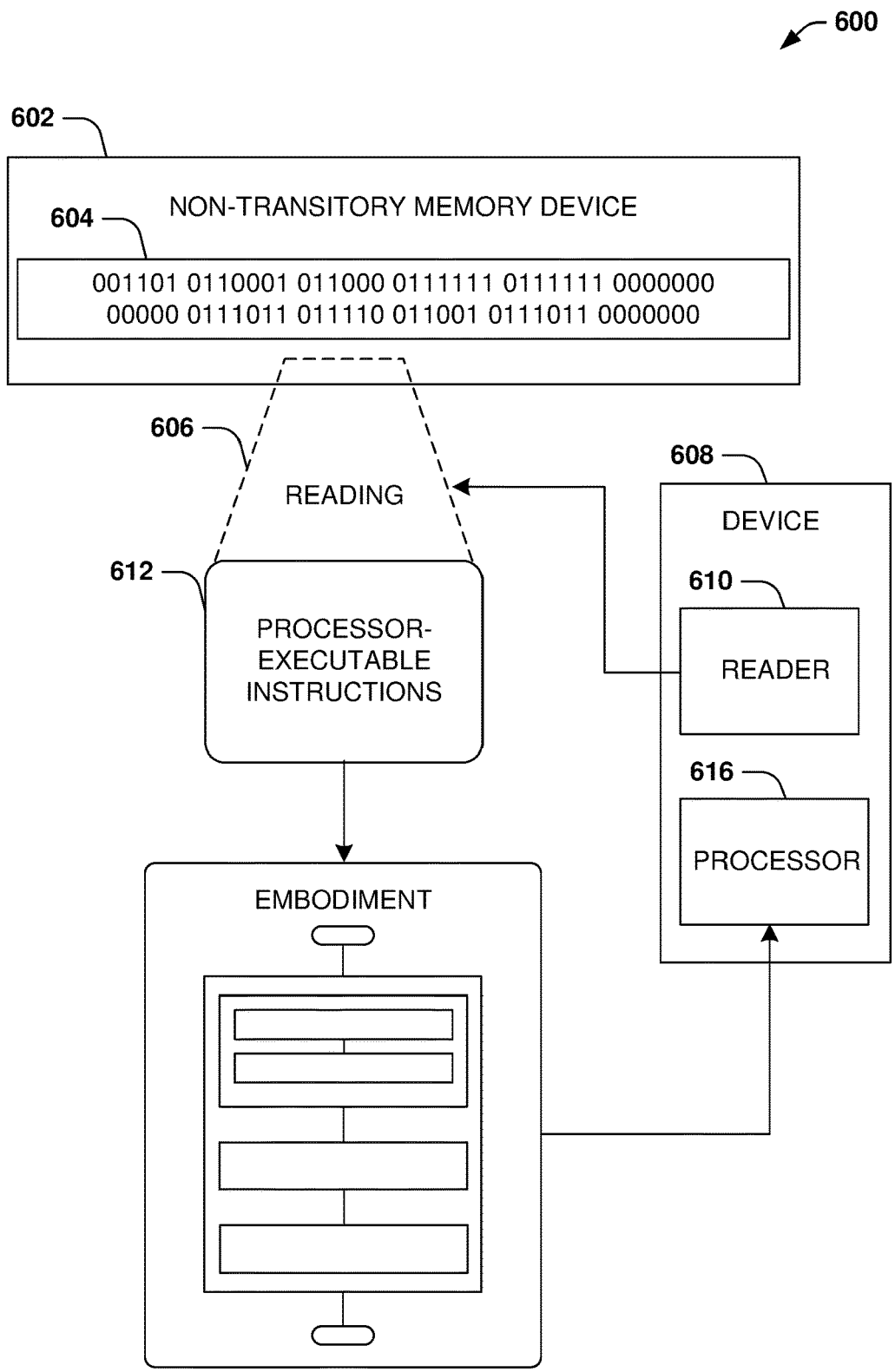
FIG. 6 is an illustration of a scenario featuring an example non-transitory machine-readable medium in accordance with one or more of the provisions set forth herein.

FIG. 6 is an illustration of a scenario 600 involving an example non-transitory machine-readable medium 602. The non-transitory machine-readable medium 602 may comprise processor-executable instructions 612 that when executed by a processor 616 cause performance (e.g., by the processor 616) of at least some of the provisions herein. The non-transitory machine-readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine-readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the example method 200 of FIG. 2, for example. In some embodiments, the processor-executable instructions 612 are configured to cause implementation of a system, such as at least some of the example system 101 of FIGS. 1A-1M, for example.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   identifying a plurality of images of an interface of an application;
   comparing a first image of the plurality of images with a second image of the plurality of images to determine first contours of a first set of regions, of the interface, in which the second image is different than the first image;
   comparing the first image with a third image of the plurality of images to determine second contours of a second set of regions, of the interface, in which the third image is different than the first image;
   determining, based upon the first contours of the first set of regions and the second contours of the second set of regions, dynamic region contours of a set of dynamic regions of the interface;
   identifying a fourth image of the interface; and
   comparing, based upon the dynamic region contours of the set of dynamic regions determined based upon the first contours of the first set of regions in which the second image is different than the first image and the second contours of the second set of regions in which the third image is different than the first image, (i) a first portion of the fourth image corresponding to a region of the fourth image outside of the dynamic region contours with (ii) a first portion of the first image corresponding to a region of the first image outside of the dynamic region contours to determine user interface testing information associated with the interface of the application.

2. The method of claim 1, wherein:
   the set of dynamic regions comprise the first set of regions and the second set of regions.

3. The method of claim 1, wherein:
   the first portion of the first image corresponds to a set of static regions, of the interface, different than the set of dynamic regions of the interface; and
   the first portion of the fourth image corresponds to the set of static regions of the interface.

4. The method of claim 3, wherein:
   the user interface testing information is indicative of a region, in the set of static regions of the interface, in which in the fourth image is different than the first image.

5. The method of claim 1, wherein:
   the user interface testing information is indicative of whether or not the interface has a user interface error.

6. The method of claim 5, wherein:
   the user interface testing information indicates that the interface has a user interface error based upon a determination that a similarity score associated with a similarity between the first portion of the first image and the first portion of the fourth image is less than a threshold.

7. The method of claim 6, wherein:
   the similarity score comprises a Structural Similarity Index (SSIM) score.

8. The method of claim 1, wherein comparing the first image with the second image to determine the first set of regions of the interface comprises:
converting the first image to a first gray-scale image;
converting the second image to a second gray-scale image;
performing a pixel to pixel comparison of the first gray-scale image with the second gray-scale image to generate a difference image representative of differences between the first gray-scale image and the second gray-scale image; and
determining the first set of regions based upon the difference image.

9. The method of claim 8, wherein:
determining the first set of regions based upon the difference image comprises:
determining edges of the difference image using canny edge detection; and
determining contours of the first set of regions based upon the edges.

10. The method of claim 1, comprising:
resizing the first image and the second image to have a first size.

11. The method of claim 1, wherein:
the plurality of images comprises screenshots captured via execution of one or more automated tests on the application.

12. A non-transitory computer-readable medium storing instructions that when executed perform operations comprising:
identifying a plurality of images of an interface of an application;
comparing a first image of the plurality of images with a second image of the plurality of images to determine first contours of a first set of regions, of the interface, in which the second image is different than the first image;
comparing the first image with a third image of the plurality of images to determine second contours of a second set of regions, of the interface, in which the third image is different than the first image;
determining, based upon the first contours of the first set of regions and the second contours of the second set of regions, dynamic region contours of a set of dynamic regions of the interface;
identifying a fourth image of the interface; and
comparing, based upon the dynamic region contours of the set of dynamic regions determined based upon the first contours of the first set of regions in which the second image is different than the first image and the second contours of the second set of regions in which the third image is different than the first image, (i) a first portion of the fourth image corresponding to a region of the fourth image outside of the dynamic region contours with (ii) a first portion of the first image corresponding to a region of the first image outside of the dynamic region contours to determine user interface testing information associated with the interface of the application.

13. The non-transitory computer-readable medium of claim 12, wherein:
the set of dynamic regions comprise the first set of regions and the second set of regions.

14. The non-transitory computer-readable medium of claim 12, wherein:
the first portion of the first image corresponds to a set of static regions, of the interface, different than the set of dynamic regions of the interface; and
the first portion of the fourth image corresponds to the set of static regions of the interface.

15. The non-transitory computer-readable medium of claim 12, wherein:
the user interface testing information is indicative of whether or not the interface has a user interface error.

16. A device comprising:
a processor coupled to memory, the processor configured to execute instructions to perform operations comprising:
identifying a plurality of images of an interface of an application;
comparing a first image of the plurality of images with a second image of the plurality of images to determine first contours of a first set of regions, of the interface, in which the second image is different than the first image;
comparing the first image with a third image of the plurality of images to determine second contours of a second set of regions, of the interface, in which the third image is different than the first image;
determining, based upon the first contours of the first set of regions and the second contours of the second set of regions, dynamic region contours of a set of dynamic regions of the interface;
identifying a fourth image of the interface; and
comparing, based upon the dynamic region contours of the set of dynamic regions determined based upon the first contours of the first set of regions in which the second image is different than the first image and the second contours of the second set of regions in which the third image is different than the first image, (i) a first portion of the fourth image corresponding to a region of the fourth image outside of the dynamic region contours with (ii) a first portion of the first image corresponding to a region of the first image outside of the dynamic region contours to determine user interface testing information associated with the interface of the application.

17. The device of claim 16, wherein:
the set of dynamic regions comprise the first set of regions and the second set of regions.

18. The device of claim 16, wherein:
the first portion of the first image corresponds to a set of static regions, of the interface, different than the set of dynamic regions of the interface; and
the first portion of the fourth image corresponds to the set of static regions of the interface.

19. The device of claim 16, wherein:
the user interface testing information is indicative of whether or not the interface has a user interface error.

20. The device of claim 16, wherein:
the user interface testing information indicates that the interface has a user interface error based upon a determination that a similarity score associated with a similarity between the first portion of the first image and the first portion of the fourth image is less than a threshold.

\* \* \* \* \*